United States Patent [19] [11] 4,077,753
Tanaka [45] Mar. 7, 1978

[54] MARBLEIZED SOAP BAR PLODDER

[75] Inventor: Yoshio Tanaka, Tokyo, Japan

[73] Assignee: Ideal Soap Co., Tokyo, Japan

[21] Appl. No.: 687,616

[22] Filed: May 18, 1976

[30] Foreign Application Priority Data

Oct. 9, 1975 Japan ............................... 50-121309

[51] Int. Cl.[2] ............................................ B29F 3/12

[52] U.S. Cl. ................................ 425/131.1; 425/462; 264/75

[58] Field of Search ..................... 425/131.1, 132, 376, 425/461, 462, 465, 190, 191; 264/349, 176 R, 75

[56] References Cited

U.S. PATENT DOCUMENTS

| | | | |
|---|---|---|---|
| 2,803,041 | 8/1957 | Hill et al. | 425/132 X |
| 3,256,562 | 6/1966 | Heard, Jr. | 425/132 X |
| 3,268,970 | 8/1966 | Kelley et al. | 425/131.1 |
| 3,947,169 | 3/1976 | Wolff et al. | 425/131.1 X |

*Primary Examiner*—Richard B. Lazarus
*Attorney, Agent, or Firm*—Nelson E. Kimmelman

[57] ABSTRACT

This application discloses a marbleized soap bar plodder comprising a multi-thread extruding screw, each of the threads of which extrudes a different colored soap material, and a means for closing one or more of the thread grooves of said extruding screw, wherein said closure means is not fixed to the screw.

3 Claims, 11 Drawing Figures

Fig. 5
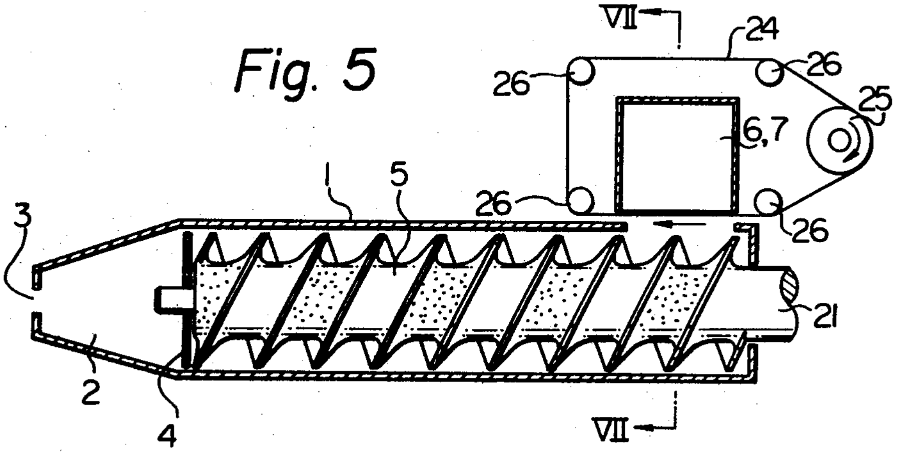
Fig. 6
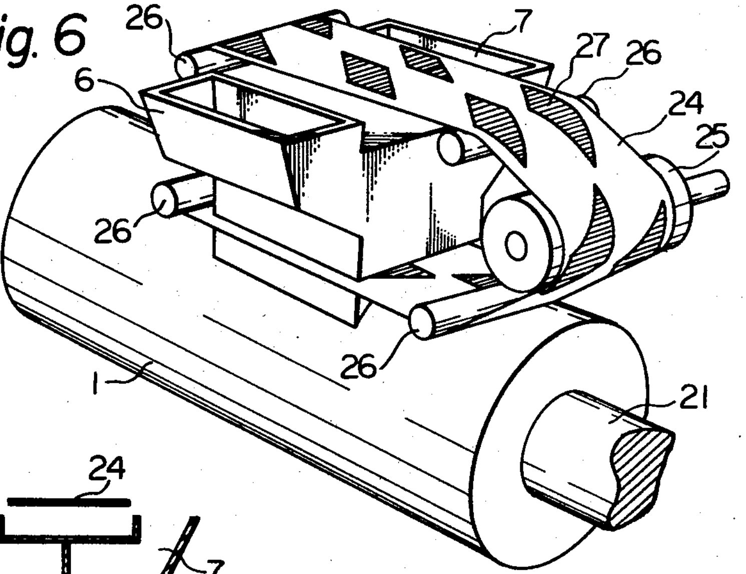
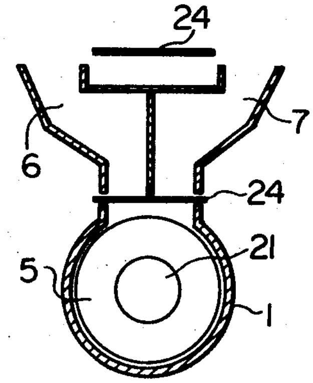
Fig. 7

MARBLEIZED SOAP BAR PLODDER

BACKGROUND OF THE INVENTION

The present invention relates to a soap bar plodder which produces marbleized soap bars made of a plurality of different colored soap materials including soap, synthetic detergent or mixtures thereof. For the sake of brevity the terms "soap", "soap bar" or "soap material" will be used to indicate the products of any of the above materials.

The inventor of the present invention previously disclosed a similar marbleized soap bar plodder in the published specification 47-3619 (3619/1972) in Japan. Said known plodder comprises: a horizontal cylinder which has a pressing chamber and a nozzle formed in front of said pressing chamber; two hoppers mounted on said cylinder, one being remote from said pressing chamber while the other is nearer, and; an extruding screw installed in said cylinder. Said extruding screw is formed as a single-thread screw under and adjacent to said remote hopper, and a second thread forming a double-thread screw is added from the part facing said nearer hopper to the front end of this extruding screw. The first thread groove is covered at the portion beneath the nearer hopper by a sealing wall which is formed integrally with the screw along the helical thread thereof and has the same outer diameter as the screw. Accordingly, the first soap material from the remote hopper passes through the space between said sealing wall and the first thread groove, whereby the second soap material from the nearer hopper can avoid being mixed with the first.

However, such a plodder has the following drawbacks. As the first soap material passes through the sealing wall along the helical thread, a large degree of frictional resistance is generated with the result that the required driving force increases and a large amount of frictional heat is produced.

Secondly, a large amount of back pressure is applied to the first soap material than to the second because of the frictional resistance generated inside the sealing wall. Accordingly, a larger amount of mechanical energy is applied to the first soap material than to the second, with the result that the viscosity, plasticity and hardness of the first soap material are different from those of the second. Consequently, the homogeneity and the desired degree of bonding to prevent cracking can not be attained with regard to a plodded soap bar consisting of two different soap materials.

SUMMARY OF THE INVENTION

An object of the present invention, is to provide a marbleized soap bar plodder in which the above drawbacks are obviated.

According to the present invention, a marbleized soap bar plodder is provided comprising a multi-thread extruding screw, each of the threads of which extrudes a different colored soap material, and a means for closing one or more of the threads, wherein said closure means is not fixed to the screw.

BRIEF DESCRIPTION OF THE DRAWINGS

The present invention will now be further described with reference to the accompanying drawings, in which:

FIG. 5 and FIG. 6 show another embodiment of the invention;

FIG. 7 shows a cross-sectional view taken on line VII—VII of FIG. 5;

Throughout all of the above drawings, like reference characters designate like or corresponding parts.

DETAILED DESCRIPTION OF THE EMBODIMENTS OF THE INVENTION

Figure 1:
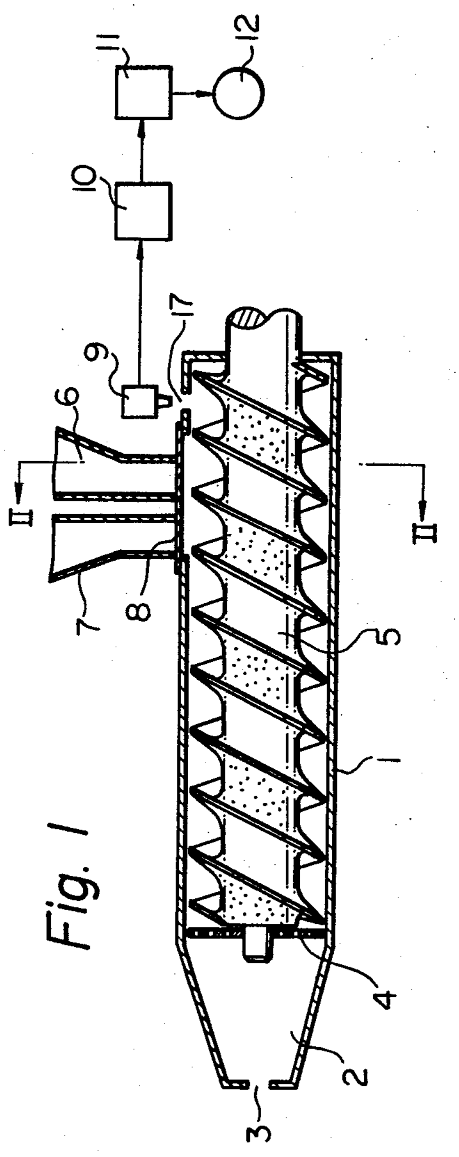
FIG. 1 shows one embodiment of the plodder according to the present invention.

Referring now to FIG. 1, a double-thread extruding screw 5 is arranged in a cylinder 1 which has a truncated cone-shaped pressing chamber 2 at its front end. Each of the two threads of the screw 5 is intended to convey soap of a different color. The chamber 2 has a nozzle 3 through which an extruded soap bar is discharged. A foraminous disk 4 having many small holes is installed near the boundary between said cylinder 1 and said pressing chamber 2 in order to give directivity and adequate back pressure to the extruded soap materials so as to produce tightly bonded soap bars. A first hopper 6 and a second hopper 7 are mounted on the cylinder 1 for feeding two differently colored soap materials. Under the hoppers 6, 7 and outside the screw 5, a closure means which will be described later is arranged in order to prevent the two soap materials from being mixed in the thread grooves. 9 is a photo-detector for discriminating the colors of the threads, 10 is a timer, 11 is a switching mechanism and 12 is a driving motor of the closure means. The photo-detector 9, the timer 10, the switching mechanism 11 and the driving motor 12 are electrically connected to each other.

Figure 2:
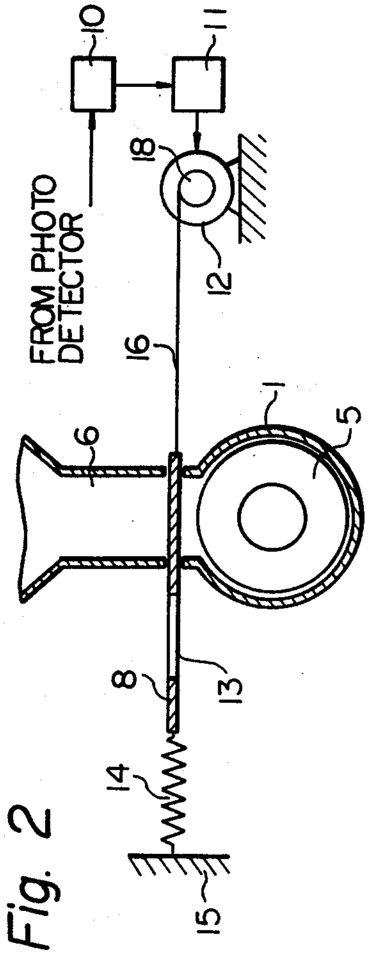
FIG. 2 shows a cross-sectional view taken on line II—II of FIG. 1.

The closure means comprises a closure plate 8 which has an opening 13 and a spring 14 (see FIG. 2). The spring 14 connects one end of the closure plate 8 to a fixed member 15 and always biases the closure plate 8 to the left in FIG. 2. The other end of said closure plate 8, is connected to a roller 18 via a wire 16 which roller 18 is fixedly installed on a shaft of the driving motor 12.

The above plodder operates as follows. Different colored soap materials are fed into the hoppers 6 and 7 respectively. At this time, the bottoms of said hoppers 6, 7 are closed by the closure plate 8. The double-thread extruding screw 5 is turned on by a driving means (not shown). When a predetermined color is detected by the photo-detector 9 through a slit 17 in the cylinder 1, a signal is sent to the switching mechanism 11 via the timer 10 to operate the driving motor 12. The roller 18 then rolls up the wire 16 so that the closure plate 8 moves to the right against the force of the spring 14. When the opening 13 is positioned under the hoppers, each of the different colored soap materials is fed into the corresponding thread grooves, respectively. The timer 10 turns the switch mechanism 11 off before the adjacent thread groove moves under the wrong hopper so that the spring 14 forces the closure plate 8 to move toward the left to close the hoppers. When the detector 9 detects the predetermined color again, the above operation is repeated.

Accordingly, each one of the hoppers corresponds to only one of the threads, with the result that one thread always extrudes one corresponding soap material. In this way, the mixing of the two materials together during extrusion, can be avoided. Each of the two soap materials extruded by the corresponding thread passes through the foraminous disk 4 into the pressing chamber 2. Here, the two materials are bonded tightly together and discharged through the nozzle 3 in the form of a soap bar which is streaked or striated by the different colors, (which condition is referred to herein as being "marbleized").

In order to discriminate visually between the two threads of the screw 5, one of the threads may be painted a different color from the other, or may be coated with a different material giving a different visual impression.

Figure 3:
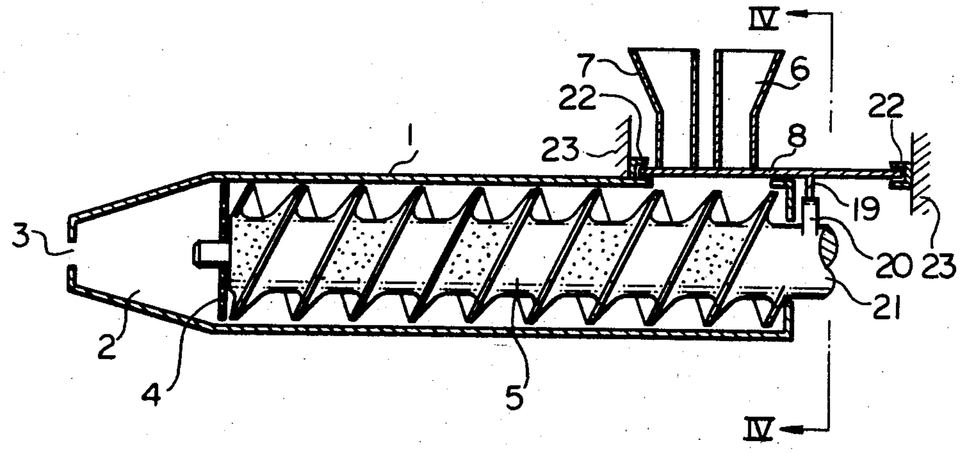
FIG. 3 shows another embodiment of the invention.
Figure 4:
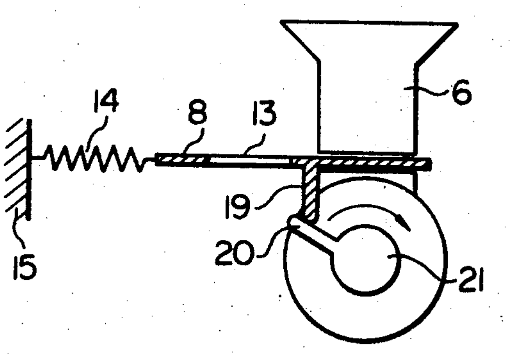
FIG. 4 shows a cross-sectional view taken on line IV—IV of FIG. 3.

Referring now to FIGS. 3 and 4, a second embodiment of the invention will be described. In this embodiment a closure plate 8 is attached to a rod 19 which engages with a projection 20 formed on the shaft 21 of the extruding screw 5. As will be seen from FIG. 3, the closure plate 8 is elongated enough so that the rod 19 can be arranged near the center thereof whereby the projection 20 can force the rod 19 to move smoothly with said plate 8. Guide members 22 for the plate 8 may be arranged on a fixed member 23.

In operation, the shaft 21 of the extruding screw 5 rotates in the direction indicated by the arrow in FIG. 4. At a predetermined position the projection 20 of the shaft 21 abuts against the rod 19, then forces it to move to the right against the force of the spring 14, whereby the closure plate 8 slides within the guide members 22 to the right in FIG. 4. When the opening 13 in the plate 8 is below the hoppers, each different colored soap material in each of the hoppers is fed into the corresponding thread groove of the double-thread screw 5. When the shaft 21 further rotates and the next adjacent thread groove is under the wrong hopper, the rod 19 is released from the projection 20 and the closure plate 8 is returned to the initial position by the resiliency of the spring 14, whereby the bottoms of the hoppers are closed. By the repetition of the above operation, the two soap materials are extruded by the corresponding threads respectively and are not mixed together in the thread grooves.

At the end of the rod 19 a roller may be arranged to ensure smooth contact with the projection 20. Rollers amy also be arranged on the closure plate 8 at the portion which comes into contact with the guide member 22 so that the plate 8 can move more smoothly.

The third embodiment of the invention will now be explained with reference to FIGS. 5, 6 and 7. In this embodiment the closure means comprises an endless closure belt 24, freely rotatable rollers 26 and a driving shaft 25. As shown in FIG. 6, the closure belt 24 has a plurality of rhomboid holes 27 which are uniformly dispersed in two rows. The pitch of said rhomboid holes 27 in one row is the same as the lead of the double-thread extruding screw 5, i.e. the distance between adjacent holes 27 in one row is substantially the same as (in practice slightly wider than) the width of one thread groove of the screw 5. Said holes 27 are alternately arranged in two rows as seen in FIG. 6. Said two rows of holes 27 correspond to the first and second hoppers 6, 7 respectively. The closure belt 24 closes the bottom of each hopper as shown in FIG. 7.

In operation, the driving shaft 25 rotates to move the closure belt 24 as indicated by the arrows in FIG. 5 at the same speed as that of the advancing movement of the thread of the screw 5. Said closure belt is initially set so that one hole 27 strictly corresponds to one thread groove, the holes 27 in one side of the closure belt 24 always correspond to the same thread groove because the pitch of the holes 27 in one row is equal to the lead (i.e. the distance thread advances per one revolution) of the screw 5 and so that their moving speeds are set to be the same. Accordingly, the soap material supplied into the first hopper 6 is always fed into its corresponding thread groove and the other soap material from the second hopper 7 is always fed into the other thread groove. The two materials are then extruded by the corresponding thread grooves, respectively. In this way, they are not mixed with each other during the extrusion process.

The driving force of the shaft 25 may be transmitted from the driving means of the extruding screw 5 (not shown) to the shaft 225 via a transmission mechanism (not shown), or another drive means may be arranged for driving the closure belt 24.

Figure 8:
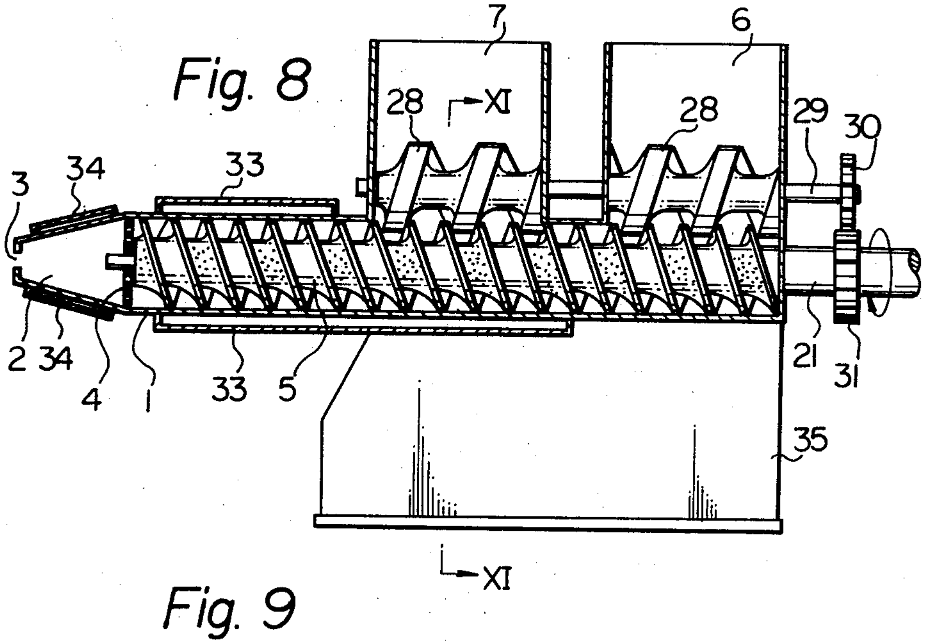
FIGS. 8, 9 and 10 show different embodiments respectively.

In FIG. 8 the fourth embodiment is shown, wherein each of the hoppers 6, 7 has a single-thread closure screw 28. The pitch of said closure screw 28 is equal to the lead of the double-thread extruding screw 5. The closure screw 28 and the extruding screw 5 are formed with respectively opposite thread directions. The width of the top of the closure thread ridge is slightly smaller than the widths of both sets of thread grooves of the screw 5. Each closure screw 28 engages respectively one set of threads of the extruding screw 5 to a small extent. The closure screw 28 in the first hopper 6 engages one of the sets of threads of the screw 5, and the closure screw 28 in the second hopper 7 engages the other set of threads of said screw 5. Both of the closure screws are installed on a common shaft 29 which is rotated in the reverse direction to the shaft 21 of the screw 5 by means of gears 30 and 31. A cooling jacket 33 is arranged around the cylinder 1 to cool down the extruded soap materials which become excessively heated because of frictional resistance occurring during extrusion. A heating jacket 34 is also arranged around the pressing chamber 2 in order to give the materials adequate plasticity. The whole of the plodder is mounted on a support member 35.

During operation, the soap material supplied into the first hopper 6 is fed into the corresponding thread groove of the screw 5 (in this embodiment into the non-obstructed spotted thread grooves) and is prevented from entering the set of other (unstippled) set grooves by the closure screw 28. On the contrary, other (unstippled) set of the other soap material supplied into the second hopper 7 is fed into the set of the plain thread grooves of the screw 5 and is prevented from entering the spotted thread grooves by means of the closure screw 28 in the hopper 7. Both of the different colored soap materials are then extruded by the corresponding thread grooves, respectively, thus avoiding mixing the two during extrusion.

Figure 9:
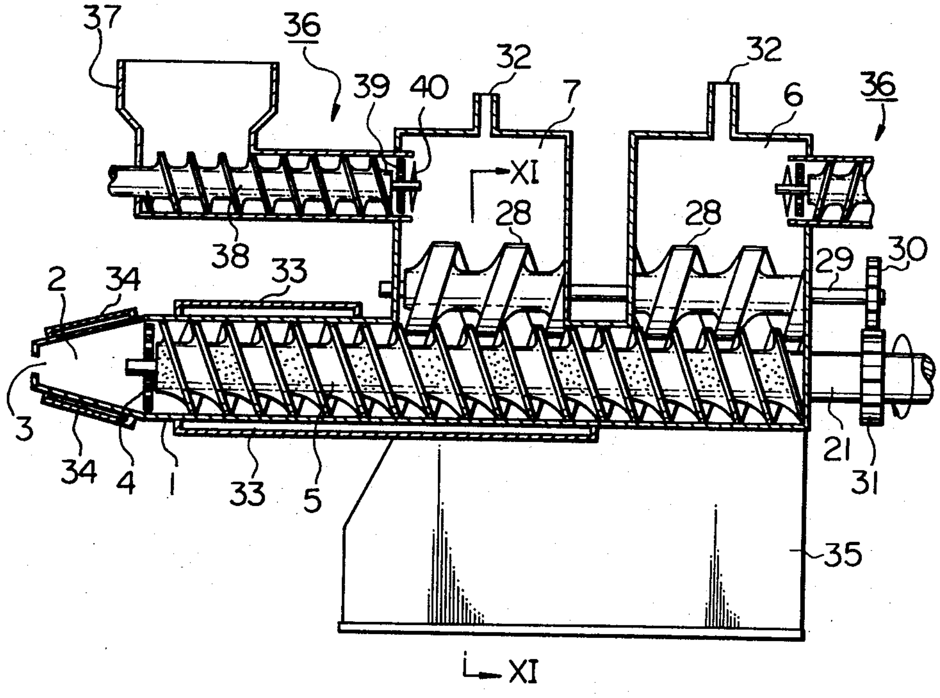

In all of the above embodiments, both of the hoppers 6, 7 may be constructed as a closed hopper, as shown in FIG. 9. In this case, each of the hoppers is closed at its top and the air is evacuated therefrom through a discharge pipe 32 by an vacuum pump (not shown) so that the soap bar extruded by the screw 5 is of high density and free from cracks. Both of the hoppers 6, 7 respectively have a supplying means 36 which feeds a soap material into the hopper and comprises a hopper 37, an extruding screw 38, a foraminous disk 39 and a cutter 40 which is installed on the shaft of the screw 38 and cuts the spaghetti-like soap material extruded through the foraminous disk 39 into pieces.

Figure 10:
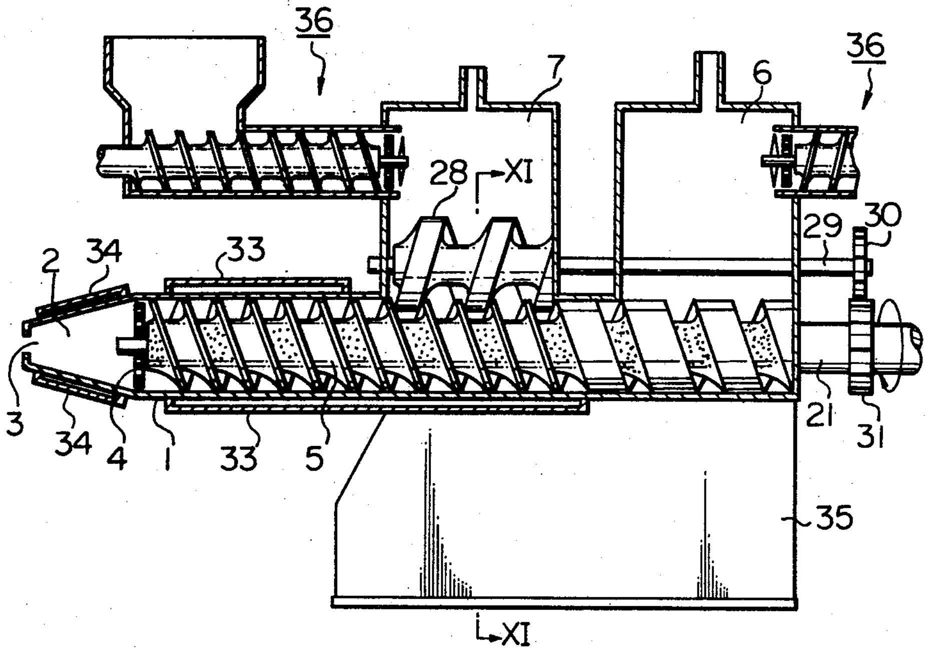
Figure 11:
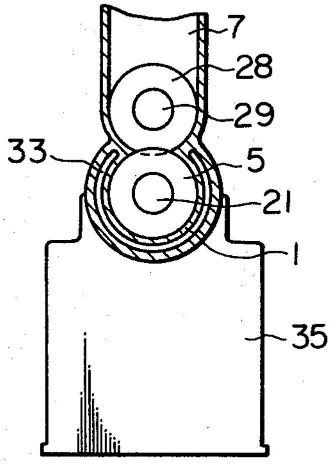
FIG. 11 shows a cross-sectional view taken on line XI—XI of FIG. 8, 9 or 10.

In FIG. 10 still another embodiment is shown. This is different from the fourth embodiment in FIG. 8 in that the first hopper 6 has no closure screw and the extruding screw 5 is a complex screw with both a single-thread screw at its right end and a double-thread screw at its left end and extending to about the middle. Under the hopper 6 the screw 5 is a single-thread screw (in this embodiment only the formation of the spotted thread is shown), and one more thread (the plain thread) is formed at the left end portion and center of said screw 5, making it a double-thread screw.

The soap material supplied to the first hopper 6 is fed into the spotted thread groove of the screw 5, and is then extruded to the pressing chamber 2 by the same thread groove. Another soap material which is supplied to the second hopper 7 is fed into the plain thread groove of the screw 5 because the dotted thread groove is covered by the closure screw 28. Then, the material from the hopper 7 is conveyed to the pressing chamber 2 by the plain thread groove. In this way, the two materials are respectively conveyed by the corresponding thread grooves into the pressing chamber 2 through the foraminous disk 4. They are then discharged through the nozzle 3 has a tightly-bonded marbleized soap bar, whch is then formed into conventional soap cakes by a known stamping machine (not shown).

The number of the threads of the extruding screw 5 (i.e. the number of different colores soap materials) is not limited to two.

In the embodiments shown in FIGS. 8, 9 and 10, in order to slightly obscure the streaks fo the plodded soap bar by mixing the materials a little, at the same time they are conveyed by the screw 5, the sealing screw 28 may be arranged so that the gap between the sealing screw thread and the extruding screw thread can be adjusted by shifting the shaft 29 of the sealing screw 28 up and down. Alternatively, the width of the thread ridge of the sealing screw 28 may intentionally be made so that it is smaller than the width of the thread groove of the screw 5 to allow a small portion of the soap material to enter the wrong thread groove. In the latter case, however, the thread ridge of screw 28 should cover at least more than half the width of the thread groove of the screw 5 in order to serve as a closure screw. It should be understood that the above respective arrangements are within the spirit and the scope of the present invention.

I claim:

1. A plodder for producing extruded soap comprising:

a. an elongated cylinder having first and second openings spaced longitudinally along the side thereof and an extrusion head toward one end thereof, b. first and second soap inlet means respectively coupled to said first and second openings for enabling respective first and second soap materials to be fed to the interior of said cylinder, c. a multithread extruding screw rotatably mounted within said cylinder to propel said first and second soap materials from said openings to said extrusion head, said screw having along its length a first section of threads juxtaposed with a second section of threads, d. a closure screw disposed in said first soap inlet means and in said first opening whose ridges engage nonadjacent grooves of said first section of threads, said nonadjacent grooves being of a single thread and being continuations of the grooves of said second section, said engagement thereby preventing substantial entry of said first soap material into said non-adjacent grooves but allowing entry of said first soap material into the intermediate grooves between said non-adjacent grooves, and e. means for driving said closure screw and said extrusion screw in opposite directions.

2. The plodder according to claim 1 wherein the width of the ridges of said first section of threads is considerably smaller than the width of the ridges of said second section.

3. The plodder according to claim 1 wherein there is also another closure screw disposed in said second soap inlet means and in said second opening whose ridges engage said intermediate grooves thereby preventing substantial entry of said second soap material into said intermediate grooves.

* * * * *

UNITED STATES PATENT OFFICE

CERTIFICATE OF CORRECTION

PATENT NO. : 4,077,753

DATED : March 7, 1978

INVENTOR(S) : Yoshio Tanaka

It is certified that error appears in the above-identified patent and that said Letters Patent are hereby corrected as shown below:

Column 3, line 49, change "amy" to --may--.

Column 4, line 21, the reference numeral "225" should be --25--.

Column 5, line 30, change "has" to --as--.

Column 5, line 34, change "colores" to --colored--.

Column 5, line 37, change "fo" to --of--.

Signed and Sealed this

*Twenty-second* Day of *August 1978*

[SEAL]

*Attest:*

RUTH C. MASON
*Attesting Officer*

DONALD W. BANNER
*Commissioner of Patents and Trademarks*